US012246696B2

United States Patent
Ogawa

(10) Patent No.: US 12,246,696 B2
(45) Date of Patent: Mar. 11, 2025

(54) HYBRID VEHICLE CONTROLLER THAT EXECUTES SWITCHING CONTROL FOR TRAVEL SECTIONS ON A TRAVEL ROUTE ACCORDING TO THE ASSIGNED CONTROL MODE

(71) Applicant: TOYOTA JIDOSHA KABUSHIKI KAISHA, Toyota (JP)

(72) Inventor: Yuki Ogawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 215 days.

(21) Appl. No.: 17/501,216

(22) Filed: Oct. 14, 2021

(65) Prior Publication Data

US 2022/0144244 A1 May 12, 2022

(30) Foreign Application Priority Data

Nov. 6, 2020 (JP) ................................ 2020-185538

(51) Int. Cl.
*B60W 20/12* (2016.01)
*B60W 20/20* (2016.01)
*H04W 4/021* (2018.01)

(52) U.S. Cl.
CPC ............ *B60W 20/12* (2016.01); *B60W 20/20* (2013.01); *H04W 4/021* (2013.01); *B60W 2556/50* (2020.02)

(58) Field of Classification Search
CPC .. B60W 20/12; B60W 20/20; B60W 2556/50; B60W 10/06; B60W 10/08; B60W 10/26; B60W 20/16; B60W 2552/05; B60W 2552/15; B60W 2554/406; B60W 50/082; B60W 2540/215; B60W 2555/60;
(Continued)

(56) References Cited

U.S. PATENT DOCUMENTS

2012/0323413 A1* 12/2012 Kedar-Dongarkar .... B60K 6/46
180/65.265
2014/0114514 A1* 4/2014 Crombez .............. B60W 20/13
903/930
(Continued)

FOREIGN PATENT DOCUMENTS

EP 2151362 B1 10/2012
JP 2010-036711 A 2/2010
(Continued)

*Primary Examiner* — Aniss Chad
*Assistant Examiner* — Stephanie T Su
(74) *Attorney, Agent, or Firm* — Sughrue Mion, PLLC

(57) ABSTRACT

A navigation ECU executes processing including the following steps. The steps include: a step of acquiring information on travel sections to destination; a step of setting a starting point travel section and an nth travel section; a step of setting an n+1th travel section as an nth travel section when the starting point travel section and the nth travel section are identical in regulation information and road type, and difference in load is equal to or less than a threshold A; and a step of integrating the travel sections from the starting point travel section to an n-1th travel section when the starting point travel section and the nth travel section are not identical in regulation information and road type, and the difference in load is greater than the threshold A.

10 Claims, 4 Drawing Sheets

(58) Field of Classification Search
CPC ........ H04W 4/021; Y02T 10/70; Y02T 10/62; Y02T 10/72; B60K 6/445
See application file for complete search history.

(56) References Cited

U.S. PATENT DOCUMENTS

| | | | |
|---|---|---|---|
| 2014/0365096 A1* | 12/2014 | Cooper | B60T 13/665 701/70 |
| 2015/0298555 A1* | 10/2015 | Bennett | B60L 58/13 701/22 |
| 2016/0023649 A1* | 1/2016 | Muller | B60W 20/13 701/22 |
| 2021/0180970 A1* | 6/2021 | Park | B60L 58/13 |
| 2022/0111828 A1* | 4/2022 | Buerger | B60W 20/12 |

FOREIGN PATENT DOCUMENTS

| | | |
|---|---|---|
| JP | 2014-151760 A | 8/2014 |
| JP | 2015-063177 A | 4/2015 |
| JP | 2020-117134 A | 8/2020 |
| WO | 2015/045261 A1 | 4/2015 |

* cited by examiner

HYBRID VEHICLE CONTROLLER THAT EXECUTES SWITCHING CONTROL FOR TRAVEL SECTIONS ON A TRAVEL ROUTE ACCORDING TO THE ASSIGNED CONTROL MODE

CROSS-REFERENCE TO RELATED APPLICATION

This application claims priority to Japanese Patent Application No. 2020-185538 filed on Nov. 6, 2020, incorporated herein by reference in its entirety.

BACKGROUND

1. Technical Field

The present disclosure relates to control of a hybrid vehicle.

2. Description of Related Art

In a hybrid vehicle mounted with a motor generator as a drive source and an engine as an electric power source, one of a plurality of control modes is selected to control the vehicle according to the selected control mode. The control modes include, for example, a charge depleting (CD) mode and a charge sustaining (CS) mode. The CD mode allows continuous electric traveling as much as possible while the engine is turned off by consuming electric power stored in an onboard battery. The CS mode allows easier startup of the engine than the CD mode, and allows the vehicle to travel while maintaining the state of charge of the onboard battery in a constant range by using the engine and the motor generator.

When such a hybrid vehicle travels to a destination set by the user, switching control is performed for switching the control modes as appropriate depending on the condition of a travel route.

For example, Japanese Unexampled Patent Application Publication No. 2014-151760 discloses a technique for setting a travel route to a destination, and selecting one of an EV mode and an HV mode for each of a plurality of sections of the set travel route except for one or more sections before the destination, the EV mode being a mode for electric traveling, the HV mode being a mode using the engine and the motor generator.

SUMMARY

A travel route set in the hybrid vehicle having the above configuration is constituted of a combination of a plurality of travel sections set based on the position of intersections or the like. As for the travel sections, in the viewpoint of reducing the required storage capacity and simplifying the processing, it is desirable to integrate and handle consecutive travel sections that are similar in travel load, road type, or the like, as a single travel section.

However, even when the travel sections are similar in travel load, road type, or the like, there are cases where, for example, some of the travel sections include a regulated section where electric traveling is required with the engine being turned off. In such a case, when the travel sections are integrated into a single travel section, the length of the travel section increases, which may hinder setting the CD mode for the regulated section in a pinpoint manner. Therefore, depending on the operating situations, unexpected electric power consumption may occur before the regulated section, and thereby the vehicle may be caused to travel with the engine being in operation even in the regulated section.

The present disclosure has been made to solve the above problem, and it is an object of the present disclosure to provide a hybrid vehicle that appropriately integrates a plurality of travel sections constituting a travel route for use in switching control according to the travel situations.

A hybrid vehicle according to an aspect of the present disclosure incudes an electric motor, a power storage device, an engine, and a controller. The electric motor is configured to generate drive force for the vehicle. The power storage device is configured to supply electric power to the electric motor. The engine is configured to generate electric power generated to charge the power storage device. The controller is configured to control the engine and the electric motor in accordance with one of a plurality of control modes. The modes include a charge depleting (CD) mode and a charge sustaining (CS) mode. The controller is configured to execute switching control for switching the control modes in accordance with a travel plan including a travel route of the vehicle to a destination, the travel route including a plurality of travel sections each assigned with one of the CD mode and the CS mode. The controller is configured to integrate consecutive travel sections, among the travel sections, into a single travel section when a predetermined condition is established in the consecutive travel sections. The predetermined condition includes a condition that regulation information matches, the regulation information indicating the presence or absence of a regulated section where predetermined regulation regarding an operating state of the vehicle is set.

With the configuration, when, for example, the regulation information indicating the presence or absence of the regulated section are not matched in the consecutive travel sections, the travel sections are not integrated. Therefore, it is possible to preferentially assign the CD mode to the regulated section, which makes it possible to restrain the engine mounted on the vehicle from being in operation while the vehicle travels in the regulated section. In addition, when the regulation information matches, the pertinent travel sections are integrated, which results in reducing the required storage capacity and simplifying the processing.

In the aspect, the regulation includes regulation of exhaust from the engine.

With the configuration, it is possible to restrain the engine mounted on the vehicle from being in operation while the vehicle travels in the regulated section where regulation regarding the exhaust from the engine is set.

Further in the aspect, when the regulation is set in some part of the travel section, the controller is configured to set the travel section as the regulated section.

With the configuration, it is possible to accurately determine whether or not the regulation information indicating the presence or absence of the regulated section matches. Hence, it is possible to restrain the engine mounted on the vehicle from being in operation while the vehicle travels in the regulated section. It is also possible to reduce the storage capacity and to simplify the processing.

Further in the aspect, the regulated section includes at least one of the travel sections including: a travel section where the vehicle is required to display information indicating permission of traveling in a predetermined area so as to be recognizable from the outside of the vehicle; a travel section where regulation is set to limit emission of a predetermined component, among exhaust components of the engine, to be equal to or less than a threshold; and a travel section within a geofencing area.

When such regulated sections are preferentially assigned with, for example, the CD mode, the vehicle is allowed to travel in compliance with the regulation.

Further in the aspect, the predetermined condition further includes at least one condition out of: a condition that the consecutive travel sections match in road type; and a condition that difference in amount of travel load corresponding to the consecutive travel sections is equal to or less than a threshold.

With the configuration, it is possible to integrate the travel sections that match in regulation information as well as matched in road type and that are similar in the amount of load. This makes it possible to reduce the required storage capacity and to simplify the processing.

Further in the aspect, the controller is configured to update the travel plan at a predetermined cycle.

With the configuration, it is possible to update the travel plan and to integrate the travel sections at a predetermined cycle. This makes it possible to reduce the required storage capacity and to simplify the processing.

According to the present disclosure, it is possible to provide a hybrid vehicle that appropriately integrates a plurality of travel sections constituting a travel route for use in switching control according to the travel situations.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

Embodiments of the present disclosure will be described hereinafter in detail with reference to the drawings. Note that identical or corresponding component members are designated by identical reference signs to avoid repetition of the description thereof.

Figure 1:
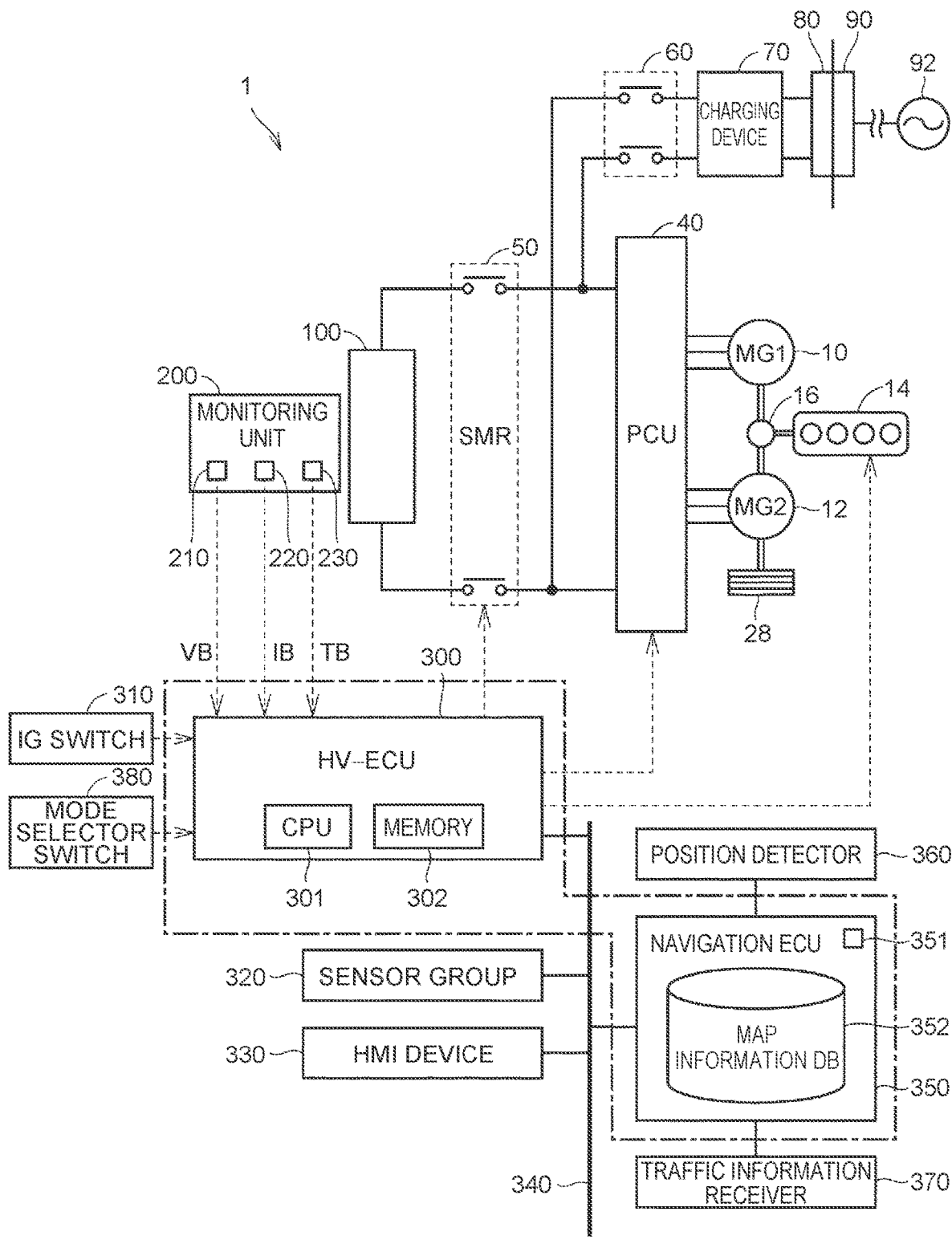
FIG. 1 shows an example of the configuration of a hybrid vehicle.

Hereinafter, description is given of an example of the configuration of a hybrid vehicle according to an embodiment of the present disclosure. FIG. 1 shows an example of the configuration of a hybrid vehicle 1 (hereinafter referred to as the vehicle 1). The vehicle 1 will be described, for example, as a series-parallel hybrid vehicle.

As shown in FIG. 1, the vehicle 1 includes a first motor generator (hereafter referred to as a first MG) 10, a second motor generator (hereafter referred to as a second MG) 12, an engine 14, a power split device 16, a drive wheel 28, a power control unit (PCU) 40, a system main relay (SMR) 50, a charging relay 60, a charging device 70, an inlet 80, a power storage device 100, a monitoring unit 200, a hybrid vehicle electronic control unit (HV-ECU) 300, an IG switch 310, a sensor group 320, a human machine interface (HMI) device 330, a navigation ECU 350, a position detector 360, a traffic information receiver 370, and a mode selector switch 380.

The first MG 10 and the second MG 12 are three-phase alternate current rotary electric machines which are, for example, permanent-magnet type synchronous electric motors including a rotor having a permanent magnet embedded therein. The first MG 10 and the second MG 12 both have functions as an electric motor (motor) and as an electric generator (generator). The first MG 10 and the second MG 12 are connected to the power storage device 100 via the PCU 40.

The first MG 10 is driven by an inverter included in the PCU 40 to rotate an output shaft of the engine 14 when, for example, the engine 14 is started up. In generating electric power, the first MG 10 generates electric power by receiving motive power from the engine 14. The electric power generated by the first MG 10 is stored in the power storage device 100 via the PCU 40.

The second MG 12 is driven by the inverter included in the PCU 40 when, for example, the vehicle 1 travels. The motive power of the second MG 12 is transmitted to the drive wheel 28 via a motive power transmission gear (not illustrated) such as a differential gear or a reduction gear. The second MG 12 is also driven by the drive wheel 28 when, for example, the vehicle 1 is braking, and thereby the second MG 12 operates as an electric power generator to perform regenerative braking. The electric power generated in the second MG 12 is stored in the power storage device 100 via the PCU 40.

The engine 14 is a publicly known internal combustion engine that burns fuel (gasoline or gas oil), such as a gasoline engine and a diesel engine, to output motive power. The engine 14 is configured such that the operating states, such as a throttle opening angle (intake air amount), a fuel supply amount, and ignition timing, can electrically be controlled by the HV-ECU 300. The HV-ECU 300 controls a fuel injection amount, the ignition timing, the intake air amount, or the like, of the engine 14 such that the engine 14 operates at a target speed and a target torque set based on the states of the vehicle 1.

The power split device 16 splits the motive power of the engine 14 to a path transmitting the motive power to the drive wheel 28 and to a path transmitting the motive power to the first MG 10. The power split device 16 is constituted of a planetary gear mechanism including, for example, a sun gear, a ring gear, a pinion gear, and a carrier.

The PCU 40 is an electric power converter that converts electric power between the power storage device 100 and the first MG 10, and between the power storage device 100 and the second MG 12 based on a control signal from the HV-ECU 300. The PCU 40 is configured to include an inverter (not illustrated) that converts direct-current electric power from the power storage device 100 to alternating-current electric power to drive the first MG 10 or the second MG 12, and a converter (not illustrated) that regulates the voltage level of the direct-current electric power supplied to the inverter from the power storage device 100.

The SMR 50 is electrically connected between the power storage device 100 and the PCU 40. Closing and opening of the SMR 50 are controlled in accordance with a control signal from the HV-ECU 300.

The power storage device 100 is a direct-current power source configured to be rechargeable, for example, a secondary battery such as a nickel-hydrogen battery or a lithium-ion battery including a solid or liquid electrolyte. As the power storage device 100, capacitors such as electric double-layered capacitors can also be adopted. The power storage device 100 supplies electric power for generating travel driving force of the vehicle 1 to the PCU 40. In addition, the power storage device 100 is charged by the electric power generated by electric power generating operation using the first MG 10 and the engine 14, charged by the electric power generated by the regenerative braking of the second MG 12, and discharged by the driving operation of the first MG 10 or the second MG 12.

The monitoring unit 200 monitors the status of the power storage device 100. The monitoring unit 200 includes, for example, a voltage detector 210, a current detector 220, and a temperature detector 230. The voltage detector 210 detects a voltage VB across the terminals of the power storage device 100. The current detector 220 detects a current IB input into and output from the power storage device 100. The temperature detector 230 detects a temperature TB of the power storage device 100. The respective detectors output the results of detection to the HV-ECU 300.

The charging relay 60 is electrically connected between the SMR 50 and the charging device 70. Closing and opening of the charging relay 60 are controlled in accordance with a control signal from the HV-ECU 300.

The charging device 70 is electrically connected between the charging relay 60 and the inlet 80. The charging device 70 is, for example, an AC-DC converter (inverter). The charging device 70 converts the alternating-current electric power supplied from the external power source 92 via a connector 90 described later and the inlet 80 into direct-current electric power, and output the direct-current electric power to the charging relay 60. The charging device 70 is controlled in accordance with a control signal from the HV-ECU 300.

The charging device 70 is not specifically limited to performing AC-DC conversion operation. When the direct-current electric power is supplied from the inlet 80 to the charging device 70, the charging device 70 may be configured to operate as a DC-DC converter.

The inlet 80 is configured to allow insertion of the connector 90 through mechanical coupling such as fitting. As the connector 90 is inserted into the inlet 80, electrical connection between the vehicle 1 and the external power source 92 is established. In this case, when the SMR 50 and the charging relay 60 are closed, the external power source 92 can supply electric power to the power storage device 100 via the charging device 70 and the charging relay 60. In the following description, charging the power storage device 100 using the electric power from the external power source 92 is referred to as plug-in charging.

The HV-ECU 300 includes a central processing unit (CPU) 301 and a memory (such as a read only memory (ROM), and a random access memory (RAM)) 302. The HV-ECU 300 controls the devices in the vehicle 1 (such as the engine 14, the PCU 40, the SMR 50, the charging relay 60, the charging device 70, and the HMI device 330) to put the vehicle 1 in a desired state, based on the signals received from the monitoring unit 200, the IG switch 310, the sensor group 320 and the mode selector switch 380 and on information such as maps and programs stored in the memory 302. Various controls executed by the HV-ECU 300 can be processed by dedicated hardware (electronic circuits) as well as by software.

The HV-ECU 300 calculates, for example, a state of charge (SOC) indicating the remaining capacity of the power storage device 100, using the result of detection by the monitoring unit 200 while the vehicle 1 is operated. The SOC expresses as a percentage a ratio of the current storage amount to the fully charged storage amount of the power storage device 100. For example, as the calculation method of the SOC, various publicly known methods, such as a method of current value accumulation (Coulomb count), or a method of estimating open circuit voltage (OCV), can be adopted.

The HV-ECU 300 is connected to the sensor group 320, the HMI device 330 and the navigation ECU 350 via a communication bus 340. The navigation ECU 350 is connected to the position detector 360 and the traffic information receiver 370.

The sensor group 320 includes, for example, an accelerator pedal sensor, a vehicle speed sensor, and a brake pedal sensor. The accelerator pedal sensor detects the amount of accelerator pedal operation by the user. The vehicle speed sensor detects the vehicle speed of the vehicle 1. The brake pedal sensor detects the amount of brake pedal operation by the user. The respective sensors output the detection results to the HV-ECU 300.

The HMI device 330 provides the user with information to assist the operation of the vehicle 1. For example, the HMI device 330 is a touch panel display provided in the cabin of the vehicle 1, the touch panel including a speaker. The HMI device 330 provides (notifies) a variety of information to the user by outputting visual information (graphic information, text information), audio information (voice information, sound information), or the like.

The HMI device 330 functions as a display that receives the current position of the vehicle 1 and map information and traffic congestion information around the current position, etc. from the navigation ECU 350 via the communication bus 340, and displays the current position of the vehicle 1 along with the map information and traffic congestion information therearound.

The HMI device 330 also functions as a user-accessible touch panel that allows the user to change the scale of the displayed map or to input a destination of the vehicle 1 by touching the touch panel. When the destination is input on the HMI device 330, the destination information is transmitted to the navigation ECU 350 via the communication bus 340.

The devices connected to the communication bus 340 may be configured to be communicable with each other via the communication bus 340 by controller area network (CAN) communication, or may be configured to be communicable with each other via wireless communication in place of or in addition to the communication bus 340.

The navigation ECU 350 includes a CPU 351 and a memory 352. The CPU 351 and the memory 352 are similar to the CPU 301 and the memory 302, respectively. Accordingly, detailed descriptions thereof are not repeated. In the memory 352, a map information database (DB) is constructed. The navigation ECU 350 outputs the current position of the vehicle 1, the map information and traffic congestion information therearound, etc. to the HMI device 330 and the HV-ECU 300, based on various information stored in the map information database DB, various information detected by the position detector 360, and various information received from the traffic information receiver 370.

In addition, the navigation ECU 350 outputs map information and road traffic information on the travel route from the current position of the vehicle 1 to the destination (hereinafter referred to as "look-ahead information") to the HV-ECU 300 at a given time (for example, every few tens of seconds or every few seconds). As shown by a chain line frame in FIG. 1, the HV-ECU 300 and the navigation ECU 350 constitute the "controller" in the present embodiment.

The map information DB stores map information. The map information includes data about "nodes" that indicate intersections, stops, etc., "links" that are made up of connections of nodes, and "facilities" (buildings, parking lots, etc.) that are located along the links. The map information also includes position information on each node, distance information on each link, road type information included in each link (information on urban areas, narrow streets, highways, general roads, etc.,), load information on each link (information such as average speed in each link that can be calculated from speed limits etc., average power required to travel each link at the average speed, or average gradient in each link), and regulation information on each link (information indicating the presence or absence of a regulated section described later). The map information is not limited to information acquired by reading from the map information DB. The map information may be acquired sequentially through communication with an external database in addition to or in place of the information acquired from the map information DB.

The position detector 360 acquires the current position of the vehicle 1 based on, for example, signals (radio wave) from global positioning system (GPS) satellites, and outputs a signal indicating the current position of the vehicle 1 to the navigation ECU 350. The method for acquiring the current position of the vehicle 1 may be a method for acquiring the current position using satellites capable of detecting the position, other than GPS satellites, or a method for acquiring the current position by exchanging prescribed information with mobile base stations or wireless local area network (LAN) access points.

The traffic information receiver 370 receives prescribed traffic information. The prescribed traffic information includes, for example, road traffic information provided by FM multiplex broadcasts, and road traffic information collected from probe vehicles or probe centers. The road traffic information includes at least traffic congestion information, and may also include other road control information and parking information. The traffic information is updated, for example, every few minutes.

The mode selector switch 380 is configured to allow selection of one of a plurality of control modes. The control modes will be described later. Upon reception of the user's operation, the mode selector switch 380 transmits to the HV-ECU 300 a signal indicating that the operation has been performed.

In the present embodiment, the vehicle 1 is controlled by the HV-ECU 300 in accordance with any one of the control modes. The control modes include a charge depleting (CD) mode and a charge sustaining (CS) mode. The CD mode is a control mode that uses discharged electric power from the power storage device 100 to continue electric driving of the vehicle 1 as much as possible while the engine 14 is stopped by consuming the electric power stored in the power storage device 100. The CS mode is a control mode that allows the engine 14 to be started more easily than the CD mode, and allows travel of the vehicle 1 while maintaining the remaining quantity (SOC) of the power storage device 100 within a constant range by charging and discharging the power storage device 100 using the engine 14, the first MG 10 and the second MG 12.

When, for example, one of the CD mode and the CS mode is set as the control mode, the HV-ECU 300 controls the engine 14, the first MG 10 and the second MG 12, depending on the set control mode.

When, for example, the travel route is not set (i.e. no destination is set), the HV-ECU 300 controls the engine 14, the first MG 10 and the second MG 12 in accordance with the CD mode until the SOC of the power storage device 100 is below a prescribed value. In other words, the HV-ECU 300 performs electric traveling using the second MG 12 while the engine 14 is in a stopped state. Even during selection of the CD mode, when the driving force required for the vehicle 1 increases due to, for example, an increased depression amount of the accelerator pedal, the HV-ECU 300 starts the engine 14 by using the first MG 10 and, causes the vehicle 1 to travel using the engine 14 and the second MG 12.

When the SOC of the power storage device 100 falls below the prescribed value, the HV-ECU 300 switches from the CD mode to the CS mode, and controls the engine 14, the first MG 10 and the second MG 12 in accordance with the CS mode. In other words, the HV-ECU 300 uses the second MG 12 to cause the vehicle 1 to travel while causing the first MG 10 to generate power using the motive power of the engine 14 so as to keep the SOC of the power storage device 100 within a prescribed range based on the SOC of the power storage device 100 when the control mode is switched. Even during selection of the CS mode, the HV-ECU 300 may stop the engine 14 and uses the second MG 12 to perform electric traveling when, for example, the SOC of the power storage device 100 exceeds the prescribed range.

The HV-ECU 300 also sets the CS mode as the control mode when, for example, the mode selector switch 380 is operated to request the CS mode. In addition, when, for example, the mode selector switch 380 is operated to request the CD mode, the HV-ECU 300 also sets the CD mode as the control mode, on condition that the SOC of the power storage device 100 is the prescribed value or more. Even in the case where the CD mode is selected by operation made on the mode selector switch 380, the HV-ECU 300 also switches from the CD mode to the CS mode when the SOC of the power storage device 100 is below the prescribed value.

In addition, when a travel route is set (when a destination is set), the HV-ECU 300 executes travel assist control to switch between the CD mode and the CS mode depending on the travel plan. In the following description, the travel assist control may be referred to as switching control.

Specifically, when the user sets a destination, the navigation ECU 350 sets a travel route from the current position of the vehicle 1 to the destination. For example, the navigation ECU 350 sets the travel route corresponding to conditions, such as a travel distance, presence or absence of highway use, and presence or absence of traffic congestion. When the destination is set, the navigation ECU 350 transmits to the HV-ECU 300 look-ahead information including information about a plurality of travel sections constituting the travel route from the current position of the vehicle 1 to the destination. When the look-ahead information is received from the navigation ECU 350, the HV-ECU 300 sets a travel plan by assigning one of the CD mode and the CS mode to each of the travel sections constituting the travel route to the destination included in the look-ahead information. In the present embodiment, the HV-ECU 300 divides the travel route into a plurality of travel sections by using, for example, the nodes on the travel route as separators between the travel sections and using the links as the travel sections.

The HV-ECU 300 acquires the updated look-ahead information in the navigation ECU 350, and calculates energy consumption En for each of the travel sections that constitute the travel route based on the acquired look-ahead information. The HV-ECU 300 calculates the energy consumption En for each of the travel sections using information included in the look-ahead information, such as slope information, road type information, information about vehicle speed including speed limits, information on the presence or absence of traffic congestion, or the travel distance or the like. The HV-ECU 300 may calculate the energy consumption En by using a vehicle weight, or the like, based on the number of occupants of the vehicle 1, in addition to the look-ahead information. The energy consumption En indicates, for example, the energy required for the vehicle 1 to travel a target travel section at a vehicle speed equivalent to the speed limit or a vehicle speed equivalent to the speed in heavy traffic.

For example, the HV-ECU 300 assigns one of the CD mode and the CS mode to each of the travel sections such that the SOC of the power storage device 100 falls within the prescribed range at the point when the vehicle 1 reaches the destination. For example, the prescribed range is the range of SOC based on which complete depletion of the electric power of the power storage device 100 can be determined. For example, an upper limit of the prescribed range may be a SOC threshold for switching from the CD mode to the CS mode. Alternatively, the upper limit of the prescribed range may be a predetermined value higher than the threshold, or may be a predetermined value lower than the threshold. A lower limit of the prescribed range is a predetermined value set to be low enough to prevent promotion of deterioration of the power storage device 100.

For example, the HV-ECU 300 assigns the CD mode to each of the travel sections when a sum of the energy consumption En for each of the travel sections (hereafter referred to as the total energy consumption) Esum is less than the energy equivalent to the amount of electric power required for the current SOC of the power storage device 100 to fall within the prescribed range (hereinafter referred to as remaining energy Er). The threshold indicates an expected value within the prescribed range of SOC when the vehicle 1 reaches the destination.

When the total energy consumption Esum is greater than the remaining energy Er, the HV-ECU 300 preferentially assigns the CD mode to at least one of the travel sections, and assigns the CS mode to those not assigned with the CD mode.

For example, the HV-ECU 300 identifies the travel sections preferentially assigned with the CD mode, among the travel sections, as the CD mode priority section, and assigns the CD mode to the identified travel sections. The CD mode priority section includes, for example, travel sections, such as regulated sections (described later), urban areas, residential areas, or narrow streets, where travel noise is required to be suppressed to relatively low levels. Information about whether the travel sections are urban areas, residential areas, or narrow streets is pre-stored in the map information DB as the road type information. The HV-ECU 300 acquires the look-ahead information including these pieces of information from the navigation ECU 350.

After the CD mode is assigned to the CD mode priority section, the HV-ECU 300 allocates the CD mode to other travel sections in order of lower energy consumption En, and integrates the energy consumption in the allocated travel sections. The HV-ECU 300 allocates the CD mode to the travel sections until a value, obtained by adding the sum of the total energy consumed in the travel sections corresponding to the CD mode priority section to the accumulated energy consumption (sum of the energy consumed in the CD mode), becomes greater than the remaining energy Er. The HV-ECU 300 stops allocating the CD mode at the point when the sum of the energy consumed in the CD mode becomes greater than the remaining energy Er, and assigns the CS mode to the travel sections not allocated with the CD mode.

In this way, the control modes can be assigned to each of the travel sections to ensure that the SOC of the power storage device 100 falls within the prescribed range at the point when the vehicle 1 reaches the destination. After the travel plan is set, the HV-ECU 300 executes switching control to switch the control modes in accordance with the set travel plan. Therefore, when the operation of the vehicle 1 is started, and the vehicle 1 passes a node on the travel route, the HV-ECU 300 switches to the control mode that is set for the travel section subsequent to the node.

The travel route set in the vehicle 1 having the above configuration is constituted of a combination of a plurality of travel sections set based on the nodes such as the position of the intersections. The storage capacity of the memory 302 in the HV-ECU 300 that executes the switching control is limited, the communication speed between the HV-ECU 300 and the navigation ECU 350 is limited, and the HV-ECU 300 and the navigation ECU 350 execute various processing operations. Accordingly, as for the travel sections, in the viewpoints of reducing the required storage capacity and communication traffic and simplifying the processing, it is desirable to integrate the consecutive travel sections that are similar in travel load, road type, or the like, as a single travel section.

However, even when the travel sections are similar in travel load, road type, or the like, there are cases where, for example, some of the travel sections include a regulated section where electric traveling is required with the engine 14 being turned off. In such a case, when the travel sections are integrated into a single travel section, the length of the travel section increases, which may hinder setting the CD mode for the regulated section in a pinpoint manner. Therefore, depending on the operating situations, unexpected electric power consumption may occur before the regulated section, and thereby the vehicle 1 may be caused to travel with the engine being in operation even in the regulated section.

Accordingly, in the present embodiment, the navigation ECU 350 is configured to integrate consecutive travel sections, among the travel sections constituting the travel route to the destination, into a single travel section when a predetermined condition is established in the consecutive travel sections. The predetermined condition includes a condition that regulation information matches, the regulation information indicating the presence or absence of the regulated section where predetermined regulation regarding an operating state of the vehicle 1 is set. In the embodiment, the predetermined regulation regarding the operating state of the vehicle 1 includes regulation of exhaust from the engine 14. The regulated section includes, for example, at least one of the travel sections including: a travel section (a travel section where application of a so-called eco-sticker is required) where the vehicle is required to display information indicating permission of traveling in a predetermined area so as to be recognizable from the outside of the vehicle; a travel section where regulation is set to limit emission of a predetermined component (for example, an exhaust component such as NOx and HC) among exhaust components of the engine 14, to be equal to or less than a threshold; and a travel section within a geofencing area.

With the configuration, when, for example, the regulation information indicating the presence or absence of the regulated section are not matched in the consecutive travel sections, the travel sections are not integrated. Therefore, it is possible to preferentially assign the CD mode to the regulated section, which makes it possible to restrain the engine 14 mounted on the vehicle 1 from being in operation while the vehicle travels in the regulated section. In addition, when the regulation information matches, the pertinent travel sections are integrated, which results in reducing the required storage capacity and simplifying the processing.

Figure 2:
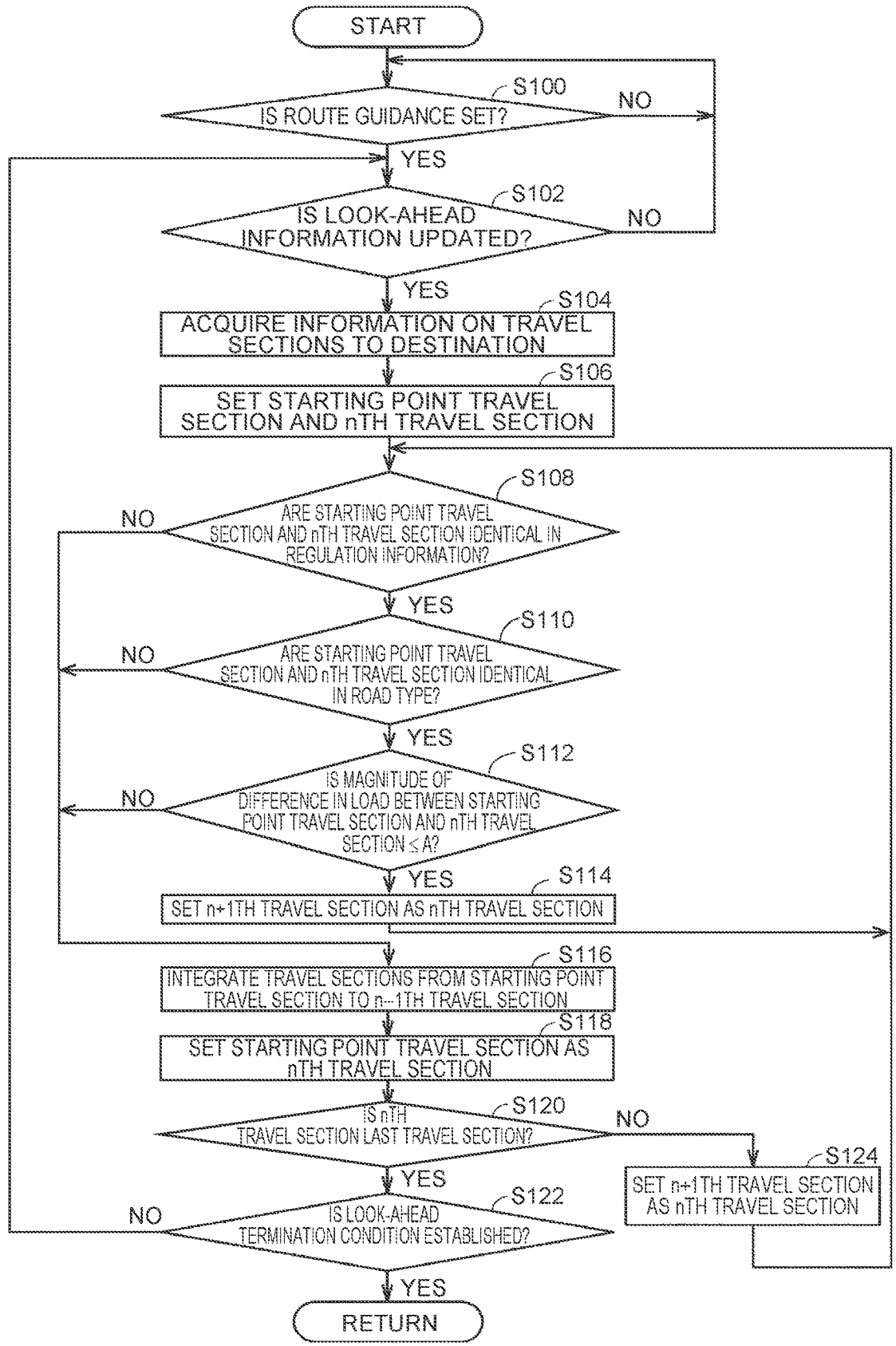
FIG. 2 is a flowchart showing an example of processing executed in a navigation ECU.

With reference to FIG. 2, the processing executed by the navigation ECU 350 will be described below. FIG. 2 is a flowchart showing an example of the processing executed by the navigation ECU 350.

In step (hereinafter stated as "S") 100, the navigation ECU 350 determines whether or not route guidance is set. The navigation ECU 350 determines that the route guidance is set when, for example, the destination is set by user operation. When it is determined that the route guidance is set (YES in S100), the processing is shifted to S102. When it is determined that the route guidance is not set (NO in S100), the processing is returned to S100.

In S102, the navigation ECU 350 determines whether or not look-ahead information is updated. The navigation ECU 350 determines that the look-ahead information is updated when, for example, road traffic information is received via the traffic information receiver 370. When it is determined that the look-ahead information is updated (YES in S102), the processing is shifted to S104. When it is determined that the look-ahead information is not updated (NO in S102), the processing is returned to S100.

In S104, the navigation ECU 350 acquires information about the travel sections that constitute the travel route to the destination based on the look-ahead information. Specifically, the navigation ECU 350 imparts an identification number to each of the travel sections that constitute the travel route from the current position to the destination. The navigation ECU 350 associates the imparted identification number with information about the travel section corresponding thereto. The information about the travel section includes, for example, regulation information indicating the presence or absence of regulation, road type information, and load information. The regulation information may be information acquired from the road traffic information or may be information preset in the map information. For example, as the regulation information, information having latest update date and time may be selected, or information acquired from the road traffic information may preferentially be selected.

The load information includes: information about the length of the travel section; information about average gradient in the travel section; information about average speed on the travel section; traffic congestion information on the travel section; information on travel time when traveling the travel section at average speed; and average power required to travel the travel section. The congestion information may include, in addition to information indicating the presence or absence of congestion, the length of congestion, average speed in consideration of congestion, traveling time in consideration of congestion, or average power in consideration of congestion.

In S106, the navigation ECU 350 sets the travel section corresponding to the current position of the vehicle 1 as a starting point travel section. In addition, the navigation ECU 350 sets a next travel section consecutive to the starting point travel section as an nth travel section. The nth travel section is set as the travel section to be compared with the starting point travel section.

In S108, the navigation ECU 350 determines whether or not regulation information on the starting point travel section is identical to the regulation information on the nth travel section. The navigation ECU 350 determines that the regulation information corresponding to the starting point travel section and the regulation information corresponding to the nth travel section are identical when, for example, both the regulation information on the starting point travel section and the nth travel section include regulation absent information indicating the absence of regulation (or include regulation present information indicating the presence of regulation).

Contrary to this, the navigation ECU 350 determines that the regulation information corresponding to the starting point travel section and the regulation information corresponding to the nth travel section are not identical when, for example, the regulation information on the starting point travel section includes the regulation absent information, and the regulation information on the nth travel section includes the regulation present information. Similarly, the navigation ECU 350 also determines that the regulation information corresponding to the starting point travel section and the regulation information corresponding to the nth travel section are not identical when, for example, the regulation information on the starting point travel section includes the regulation present information, and the regulation information on the nth travel section includes the regulation absent information.

When it is determined that the regulation information on the starting point travel section and the nth travel section are identical (YES in S108), the processing is shifted to S110. When it is determined that the regulation information on the starting point travel section and the nth travel section are not identical (NO in S108), the processing is shifted to S116.

In S110, the navigation ECU 350 determines whether or not road type on the starting point travel section and the nth travel section are identical. The navigation ECU 350 determines that the road type corresponding to the starting point travel section and the road type corresponding to the nth travel section are identical when, for example, both the road type on the starting point travel section and the nth travel section are general road or highway.

The navigation ECU 350 determines that the road type corresponding to the starting point travel section and the road type corresponding to the nth travel section are not identical when, for example, the road type on the starting point travel section is general road, and the road type information on the nth travel section is highway. Similarly, the navigation ECU 350 determines that the road type corresponding to the starting point travel section and the road type corresponding to the nth travel section are not identical when, for example, the road type on the starting point travel section is highway and the road type on the nth travel section is general road.

When it is determined that the road type on the starting point travel section and the nth travel section are identical (YES in S110), the processing is shifted to S112. When it is determined that the road type on the starting point travel section and the nth travel section are not identical (NO in S112), the processing is shifted to S116.

In S112, the navigation ECU 350 determines whether or not the magnitude of difference in load between the starting point travel section and the nth travel section is equal to or less than a threshold A. For example, the navigation ECU

350 may calculate the difference by using the energy (a product of average power and traveling time) consumed in each travel section as load, or calculate the difference with average gradient in each travel section as load. The threshold A is, for example, a predetermined value used to determine that the load in two travel sections is similar. The threshold A is adapted by experiments. When it is determined that the magnitude of the difference in load between the starting point travel section and the nth travel section is equal to or less than the threshold A (YES in S112), the processing is shifted to S114. When it is determined that the magnitude of the difference in load between the starting point travel section and the nth travel section is greater than the threshold A (NO in S112), the processing is shifted to S116.

In S114, the navigation ECU 350 sets a next travel section consecutive to the nth travel section as the nth travel section. In this case, the travel section immediately before the set nth travel section is set as an n−1th travel section.

In S116, the navigation ECU 350 executes integration processing to integrate the travel sections from the starting point travel section to the n−1th travel section into a single travel section Specifically, the navigation ECU 350 sets a sum of the length of the travel sections from the starting point travel section to the n−1th travel section as the length of the integrated travel section. In addition, the navigation ECU 350 sets a sum of the traveling time from the starting point travel section to the n−1th travel section as the traveling time of the travel section. In addition, the navigation ECU 350 calculates an average vehicle speed in the integrated travel section by dividing the length of the integrated travel section by the traveling time of the integrated travel section. In addition, the navigation ECU 350 calculates a sum of values obtained by multiplying the traveling time and the average power in the respective travel sections from the starting point travel section to the n−1th travel section, and then calculates the average power in the integrated travel section by dividing the calculated sum by the traveling time of the integrated travel section.

Furthermore, the navigation ECU 350 sets the regulation information corresponding to the starting point travel section as the regulation information corresponding to the integrated travel section. The navigation ECU 350 further sets the road type corresponding to the starting point travel section as the road type corresponding to the integrated travel section.

In S118, the navigation ECU 350 sets the nth travel section as the starting point travel section.

In S120, the navigation ECU 350 determines whether or not the nth travel section is the last travel section. For example, when the identification number imparted to the nth travel section is identical to the identification number corresponding to the last travel section, the navigation ECU 350 determines that the nth travel section is the last travel section. When it is determined that the nth travel section is the last travel section, (YES in S120), the processing is shifted to S122. The navigation ECU 350 determines that the nth travel section is not the last travel section.

In S122, the navigation ECU 350 determines whether or not a look-ahead termination condition is established. For example, the look-ahead termination condition includes a condition that at least one condition is established out of: a condition that the vehicle 1 reaches the destination; a condition that predetermined abnormality occurs in the vehicle 1; and a condition that route guidance is stopped by user operation or because the current position of the vehicle 1 is a predetermined distance or more away from the set travel route. When it is determined that the look-ahead termination condition is established (YES in S122), the processing is ended. When it is determined that the look-ahead termination condition is not established (NO in S122), the processing returns to S102.

In S124, the navigation ECU 350 sets a next travel section consecutive to the nth travel section as the nth travel section. In this case, the travel section immediately before the set nth travel section is set as an n−1th travel section.

Figure 3:
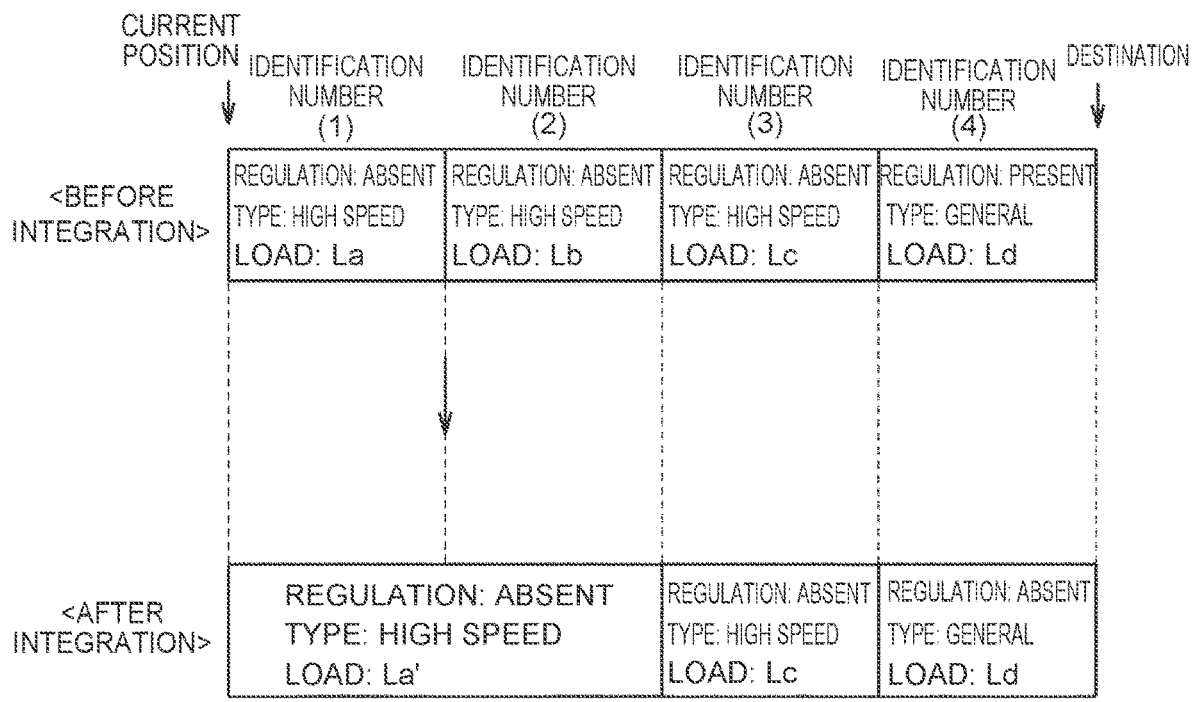
FIG. 3 is an explanatory view of an example of travel sections integrated by integration processing.

Description is given of the operation of the navigation ECU 350 mounted on the vehicle 1 in the present embodiment based on the structure and flowchart as described in the foregoing with reference to FIG. 3. FIG. 3 is an explanatory view of an example of the travel sections integrated by integration processing. Assume the case where, for example, the travel route from the current position to the destination is constituted of four travel sections.

When, for example, the vehicle 1 is started up by the start-up operation of the user, the IG flag is put in the ON state. Then, once the route guidance is started by, for example, the user setting a destination, the assist condition is established. When the look-ahead information is updated, the switching control is executed.

In this case, since the route guidance is set (YES in S100), the navigation ECU 350 acquires the information on the travel sections to the destination (S104) when it is determined that the look-ahead information is updated (YES in S102).

In this case, identification number (1) is imparted to the travel section including the current position, identification number (2) is imparted to a next consecutive travel section, identification number (3) is imparted to a travel section after the next consecutive travel section, and identification number (4) is imparted to the travel section including the destination. As shown in FIG. 3, the regulation information on only the travel section with the identification number (3), out of the travel sections with the identification numbers (1) to (4), includes the regulation present information. The road type information on the travel sections with the identification numbers (1) to (3), out of the travel sections with the identification numbers (1) to (4), includes information indicating that the road type is highway, and the road type information on the travel section with the identification number (4) includes information indicating that the road type is general road. Loads La, Lb, Lc, Ld are similar in level, for example.

Among a plurality of travel sections to the destination, the travel section (identification number (1)) corresponding to the current position of the vehicle 1 is set as a starting point travel section, and a next travel section (identification number (2)) consecutive to the starting point travel section is set as the nth travel section (S106).

When the regulation information on the starting point travel section and the regulation information on the nth travel section are identical (YES in S108), the road type of the starting point travel section and the road type of the nth travel section are identical (YES in S110), and the magnitude of difference in load between the starting point travel section and the nth travel section (La−Lb) is less than or equal to the threshold A (YES in S112), the travel section (Identification Number (3)) next to the nth travel section is set as the nth travel section to be compared with a new starting point travel section (S114). Then, the set nth travel section and the starting point travel section are compared in regulation information, road type, and load.

Because the regulation information on the starting point travel section includes regulation absent information, and the regulation information on the nth travel section includes regulation present information, it is determined that the regulation information are not identical (NO in S108). Hence, the integration processing of the travel sections from the starting point travel section (identification number (1)) to the n−1th travel section (identification number (2)) is executed (S116). The length, average vehicle speed, average power, average gradient, and load (La') of the integrated travel section is calculated using various information on the travel section with the identification number (1) and the travel section with the identification number (2). Since the method of calculation is as described above, the detailed description thereof is not repeated.

Then, the navigation ECU 350 sets the nth travel section (identification number (3)) as the starting point travel section (S118). Since the nth travel section is not the last travel section (NO in S120), the n+1th travel section (identification number (4)) is set as the nth travel section (S124).

In this case, since the regulation information are not identical (NO in S108), the integration processing of the travel sections from the starting point travel section to the n−1th travel section are executed. Since the n−1th travel section is the same as the starting point travel section, the information identical to various information corresponding to the starting point travel section is set as the various information corresponding to the integrated travel section.

Then, the nth travel section (identification number (4)) is set as the starting point travel section (S118). Since the set nth travel section is the last travel section (YES in S120), the processing is ended when the look-ahead termination condition is established (YES in S122).

The processing as described in the foregoing is executed every time the look-ahead information is updated, i.e. at a predetermined cycle. After the integration processing is executed, the travel plan is set in the switching control using the travel sections after the integration processing.

As described in the foregoing, according to the hybrid vehicle of the present embodiment, when the regulation information indicating the presence or absence of the regulated section are not matched in the consecutive travel sections, the travel sections are not integrated. Therefore, it is possible to preferentially assign the CD mode to the regulated section, which makes it possible to restrain the engine 14 mounted on the vehicle 1 from being in operation while the vehicle 1 travels in the regulated section. In addition, when the regulation information matches, the pertinent travel sections are integrated, which results in reducing the storage capacity required in the navigation ECU 350 and the HV-ECU 300 and simplifying the processing. Accordingly, it is possible to provide the hybrid vehicle that appropriately integrates a plurality of travel sections constituting a travel route for use in switching control according to the travel situations.

Furthermore, it is possible to restrain the engine 14 from being in operation when the vehicle 1 travels at least in any one travel section out of the travel section where application of the eco-sticker is required, an emission control section, and the travel section within the geofencing area.

Furthermore, when the travel sections are integrated on conditions that the travel sections have similar load and identical road type, in addition to the condition that the presence or absence of regulation is matched, the necessary storage capacity is reduced and the processing is simplified.

Hereinafter, modifications will be described.

In the embodiment, the vehicle 1 has been described, for example, as a series parallel hybrid vehicle. However, as long as the CD mode and the CS mode can be set, the vehicle 1 may be any hybrid vehicle, such as a series hybrid vehicle, other than the series parallel hybrid vehicle.

Furthermore, in the embodiment described in the foregoing, the HV-ECU 300 and the navigation ECU 350 each execute their prescribed processing, and exchange various information to operate in cooperation. However, a single ECU having the functions of the HV-ECU 300 and the functions of the navigation ECU 350 may execute the prescribed processing.

In the embodiment described in the foregoing, the navigation ECU 350 compares the starting point travel section and the nth travel section during the route guidance, and executes the integration processing of the similar travel sections. However, for example, when the destination or the travel route of the vehicle 1 can be estimated, the navigation ECU 350 may execute the integration processing of the similar travel sections, among the estimated travel sections up to the destination or the travel sections constituting the estimated travel route, even though the route guidance is not performed. Alternatively, the navigation ECU 350 may execute the integration processing of the similar travel sections, among the travel sections, within a predetermined area around the current position.

Furthermore, in the embodiment described in the foregoing, the navigation ECU 350 compares the starting point travel section and the nth travel section during the route guidance, and executes the integration processing of the similar travel sections. However, when one of the starting point travel section and the nth travel section has congestion while the other travel section does not have congestion, the navigation ECU 350 may not integrate two travel sections even though the two travel sections have similar regulation information, road type and load. Alternatively, when both the travel sections have congestion though the length of the congestion is different, the navigation ECU 350 may not integrate the two travel sections, or when difference in length of the congestion is equal to or less than a threshold, the navigation ECU 350 may integrate the two travel sections.

Furthermore, in the embodiment described in the foregoing, the navigation ECU 350 compares the starting point travel section and the nth travel section during the route guidance, and executes the integration processing of the similar travel sections. However, for example, when one of the two travel sections has a length equal to or less than a threshold, the navigation ECU 350 may not integrate the travel sections.

Furthermore, in the embodiment described in the foregoing, the navigation ECU 350 compares the starting point travel section and the nth travel section during the route guidance, and executes the integration processing of two travel sections when the two travel sections are identical in regulation information and road type and are similar in load. However, for example, when both the two travel sections are set as the regulated sections, and the two travel sections are identical in road type and similar in load during the route guidance, the ECU 350 may execute the integration processing of the two travel sections. Alternatively, when both the two travel sections are set as non-regulated sections, and the two travel sections are identical in road type and similar in load, the ECU 350 may execute the integration processing of the two travel sections.

In this case, when some part of the travel sections have regulation, the navigation ECU 350 sets the travel section having the regulation as the regulated section. When the travel sections do not have any regulation, the travel sections are set as the non-regulated section. Since the description of the regulation is as described above, the detailed description thereof is not repeated.

Figure 4:
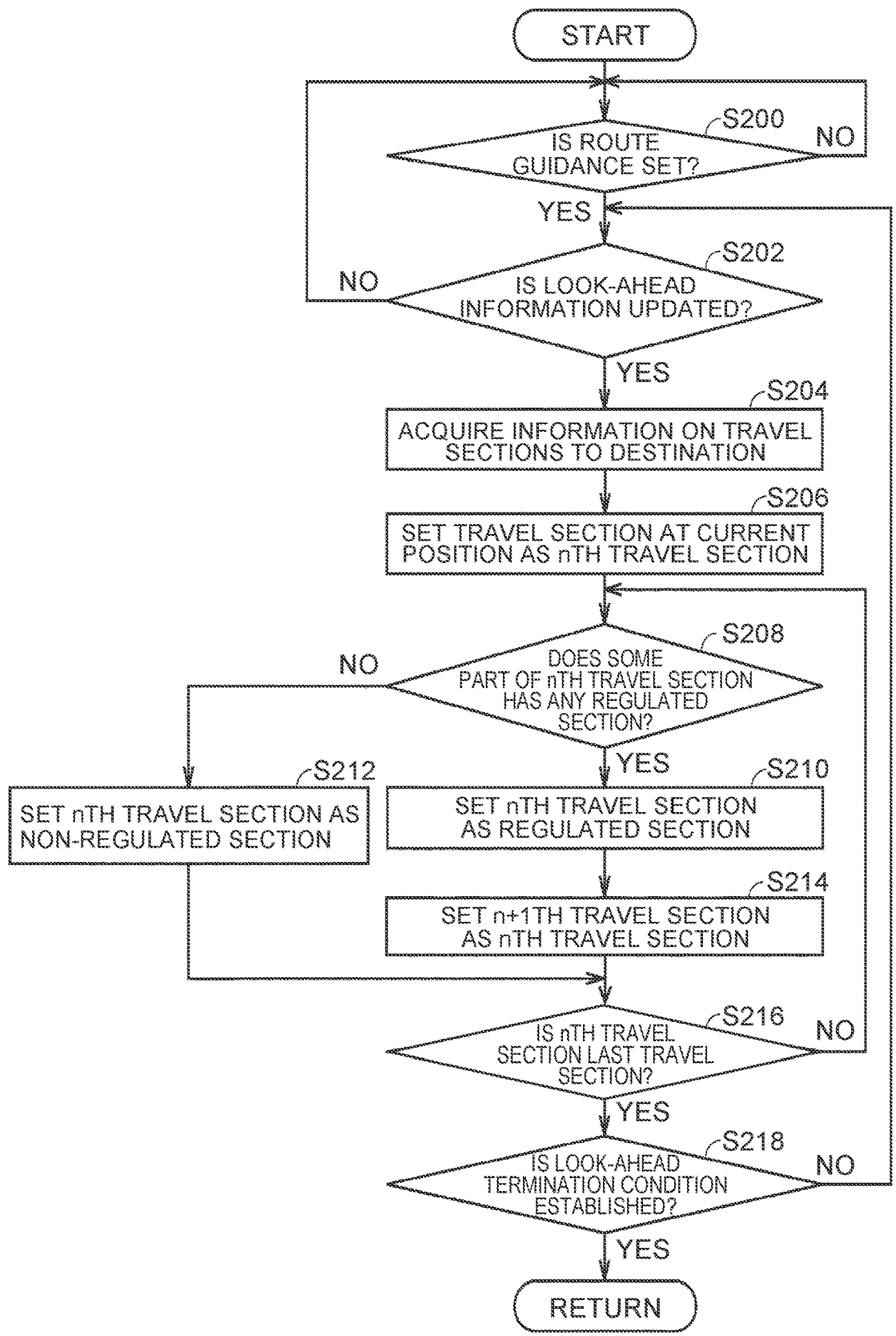
FIG. 4 is a flowchart showing an example of processing executed in the navigation ECU in a modification.

With reference to FIG. 4, the processing for setting the regulated section and the non-regulated section executed by the navigation ECU 350 will be described below in detail. FIG. 4 is a flowchart showing an example of the processing executed in the navigation ECU 350.

In S200, the navigation ECU 350 determines whether or not route guidance is set. When it is determined that the route guidance is set (YES in S200), the processing is shifted to S202. When it is determined that the route guidance is not set (NO in S200), the processing is returned to S200.

In S202, the navigation ECU 350 determines whether or not look-ahead information is updated. When it is determined that the look-ahead information is updated (YES in S202), the processing is shifted to S204. When it is determined that the look-ahead information is not updated (NO in S202), the processing is returned to S200.

In S204, the navigation ECU 350 acquires information about the travel sections that constitute the travel route to the destination based on the look-ahead information. Specifically, the navigation ECU 350 imparts an identification number to each of the travel sections that constitute the travel route from the current position to the destination. The navigation ECU 350 associates the imparted identification number with information about the travel section corresponding thereto. The information about the travel section includes, for example, regulation information for specifying the presence or absence of regulation, the position or section to be regulated, the road type information, and the load information. The regulation information may be information acquired from the road traffic information or may be information preset in the map information. For example, as the regulation information, the information having a latest update date and time may be selected, or the information acquired from the road traffic information may preferentially be selected. Since the load information is as described above, the detailed description present not repeated.

In S206, the navigation ECU 350 sets the travel section at the current position as the nth travel section indicating a target for determining whether or not the travel section is the regulated section.

In S208, the navigation ECU 350 determines whether or not some part of the nth travel section has any regulated section. For example, the navigation ECU 350 acquires the position information on the travel section set as the nth travel section and the position information on the regulated sections. When the travel section includes any regulated section, the navigation ECU 350 determines that some part of the nth travel section includes the regulated section. When it is determined that some part of the nth travel section has the regulated section (YES in S208), the processing is shifted to S210.

In S210, the navigation ECU 350 sets the nth travel section as the regulated section, and shifts the processing to S214. The navigation ECU 350 associates the identification number corresponding to the nth travel section with the information indicating that the section is the regulated section. When it is determined that the nth travel section has no regulated section (NO in S208), the processing is shifted to S212.

In S212, the navigation ECU 350 sets the nth travel section as the regulated section, and shifts the processing to S214. The navigation ECU 350 associates the identification number corresponding to the nth travel section with the information indicating that the section is the non-regulated section.

In S214, the navigation ECU 350 sets a next travel section consecutive to the nth travel section as the nth travel section, and shifts the processing to S216.

In S216, the navigation ECU 350 determines whether or not the nth travel section is the last travel section. For example, when the identification number imparted to the nth travel section is identical to the identification number corresponding to the last travel section, the navigation ECU 350 determines that the nth travel section is the last travel section. When it is determined that the nth travel section is the last travel section, (YES in S216), the processing is shifted to S218. When it is determined that the nth travel section is not the last travel section, (NO in S216), the processing is returned to S208.

In S218, the navigation ECU 350 determines whether or not the look-ahead termination condition is established. Since the look-ahead termination condition is as described above, the detailed description thereof is not repeated. When it is determined that the look-ahead termination condition is established (YES in S218), the processing is ended. When it is determined that the look-ahead termination condition is not established (NO in S218), the processing returns to S202.

Description is given of the operation of the navigation ECU 350 in the modification based on the structure and flowchart as described in the foregoing.

When it is determined that the route guidance is set (YES in S200) and the look-ahead information is updated (YES in S202), the navigation ECU 350 acquires the information on the travel sections to the destination (S204).

Among a plurality of travel sections to the destination, the travel section corresponding to the current position of the vehicle 1 is set as the nth travel section (S206).

When some part of the nth travel section has any regulation (YES in S208), the nth travel section is set as the regulated section (S210). Then, the travel section next to the nth travel section is set as the new nth travel section (S214). When the set nth travel section is not the last travel section (NO in S216), the navigation ECU 350 determines whether or not some part of the nth travel section has any regulation again (S208). When some part of the nth travel section has no regulation (NO in S208), the nth travel section is set as the non-regulated section (S212).

Then, when the set nth travel section is the last travel section (S216), and the look-ahead termination condition is established (YES in S218), the processing is ended.

The navigation ECU 350 then executes the processing shown in the flowchart in FIG. 2. At the time, in the processing of S108 in FIG. 2, the navigation ECU 350 determines that the regulation information are identical when both the starting point travel section and the nth travel section are the regulated sections, or when both the starting point travel section and the nth travel section are the non-regulated sections. The navigation ECU 350 transmits to the HV-ECU 300 information about the travel route to the destination including the current position of the vehicle 1 as well as the integrated travel section, as the look-ahead information. The HV-ECU 300 executes the switching control using the information received from the navigation ECU 350.

With the configuration, among a plurality of travel sections, consecutive travel sections including no regulated section and consecutive travel sections including the regulated section can be set as a target for integration. This makes it possible to simplify the processing of switching control.

Furthermore, in the embodiment described in the foregoing, the navigation ECU 350 compares the starting point travel section and the nth travel section during the route guidance, and executes the integration processing of the two travel sections when the two travel sections are identical in regulation information and road type and are similar in load. However, for example, when the two travel sections are identical in regulation information, the navigation ECU 350 may execute the integration processing of the two travel sections, and when the two travel sections are different in regulation information, the navigation ECU 350 may not execute the integration processing of the two travel sections. Alternatively, when the two travel sections are identical in regulation information and road type, the navigation ECU 350 may execute the integration processing of the two travel sections, and when the two travel sections are different in one of the regulation information and the road type, the navigation ECU 350 may not execute the integration processing of the two travel sections. Alternatively, when the two travel sections are identical in regulation information and similar in load, the navigation ECU 350 may execute the integration processing of the two travel sections, and when the two travel sections are different in regulation information, or when the two travel sections are not similar in load, the navigation ECU 350 may not execute the integration processing of the two travel sections.

All or part of the afore-mentioned modifications may be appropriately combined and executed. It should be understood that the embodiment disclosed is in all respects illustrative and are not considered as the basis for restrictive interpretation. The scope of the present disclosure is defined not by the foregoing description but by the range of appended claims. All changes which come within the range of the claims and meaning and the range of equivalency thereof are therefore intended to be embraced therein.

What is claimed is:

1. A hybrid vehicle, comprising:
    an electric motor configured to generate drive force for the vehicle;
    a power storage device configured to supply electric power to the electric motor;
    an engine configured to generate electric power to charge the power storage device; and
    a controller configured to control the engine and the electric motor in accordance with one of a plurality of control modes, wherein:
    the control modes include a charge depleting mode and a charge sustaining mode;
    the controller is configured to;
    divide a travel route of the vehicle to a destination into a plurality of travel sections;
    integrate consecutive travel sections, among the plurality of travel sections, into an integrated single travel section when a predetermined condition is satisfied in the consecutive travel sections, wherein the predetermined condition is satisfied when the consecutive travel sections have a same traffic regulation for exhaust from the engine of the vehicle, in order to reduce a total number of travel sections on the travel route;
    assign the charge depleting mode or the charge sustaining mode to each of the travel sections, including the integrated single travel section, based on the traffic regulation; and
    execute switching control while the vehicle travels on the travel route according to the assigned control mode for each of the travel sections including the integrated single travel section.

2. The hybrid vehicle according to claim 1, wherein when the traffic regulation is set in some part of the travel section, the controller is configured to set the travel section as a regulated section.

3. The hybrid vehicle according to claim 2, wherein the regulated section includes a travel section where a regulation limits emission of a predetermined component, among exhaust components of the engine, to be equal to or less than a threshold.

4. The hybrid vehicle according to claim 2, wherein the regulated section includes:
    a travel section where the vehicle is required to display information indicating permission of traveling in a predetermined area so as to be recognizable from outside of the vehicle.

5. The hybrid vehicle according to claim 1, wherein the predetermined condition is satisfied in the consecutive travel sections when the consecutive travel sections are identical in road type.

6. The hybrid vehicle according to claim 1, wherein the controller is configured to update the travel plan at a predetermined cycle.

7. The hybrid vehicle according to claim 2, wherein the controller is further configured to assign the charge depleting mode to a travel section of the travel sections that includes the regulated section before assigning one of the control modes to other travel sections of the travel sections.

8. The hybrid vehicle according to claim 7, wherein after assigning the charge depleting mode to the travel section that includes the regulated section, the controller is configured to assign the charge depleting mode to the other travel sections in order of lower energy consumption.

9. The hybrid vehicle according to claim 1, wherein the controller is configured to assign the charge depleting mode or the charge sustaining mode to each of the travel sections such that a state of charge of the power storage device falls within a prescribed range at a point when the hybrid vehicle reaches a destination.

10. The hybrid vehicle according to claim 1, wherein when a sum of total energy consumed in travel sections assigned with the charge depleting mode becomes greater than a remaining energy of the power storage device, the controller is configured to assign the charge sustaining mode to travel sections not allocated with the charge depleting mode.

* * * * *